United States Patent
Snyder et al.

(10) Patent No.: US 9,964,037 B2
(45) Date of Patent: May 8, 2018

(54) STAGED HEAT EXCHANGERS FOR MULTI-BYPASS STREAM GAS TURBINE ENGINES

(71) Applicant: United Technologies Corporation, Hartford, CT (US)

(72) Inventors: Ryan K. Snyder, Glastonbury, CT (US); Michael R. Thomas, Bloomfield, CT (US)

(73) Assignee: United Technologies Corporation, Farmington, CT (US)

( * ) Notice: Subject to any disclaimer, the term of this patent is extended or adjusted under 35 U.S.C. 154(b) by 649 days.

(21) Appl. No.: 14/606,076

(22) Filed: Jan. 27, 2015

(65) Prior Publication Data

US 2016/0177828 A1     Jun. 23, 2016

Related U.S. Application Data

(60) Provisional application No. 61/944,611, filed on Feb. 26, 2014.

(51) Int. Cl.

| | |
|---|---|
| *F02K 3/105* | (2006.01) |
| *F02C 6/08* | (2006.01) |
| *F02K 3/075* | (2006.01) |
| *F02K 3/077* | (2006.01) |
| *F02K 3/115* | (2006.01) |
| *F02C 7/18* | (2006.01) |

(52) U.S. Cl.
CPC ............... *F02C 6/08* (2013.01); *F02C 7/185* (2013.01); *F02K 3/075* (2013.01); *F02K 3/077* (2013.01); *F02K 3/115* (2013.01); *F05D 2260/213* (2013.01); *Y02T 50/675* (2013.01)

(58) Field of Classification Search
CPC .. F02C 6/08; F02C 7/185; F02K 3/075; F02K 3/077; F05D 2260/213
See application file for complete search history.

(56) References Cited

U.S. PATENT DOCUMENTS

| | | | |
|---|---|---|---|
| 4,213,738 A | 7/1980 | Williams | |
| 4,821,522 A | 4/1989 | Matthews et al. | |
| 5,269,135 A | * 12/1993 | Vermejan | F02C 7/04 |
| | | | 60/226.1 |
| 5,281,097 A | 1/1994 | Wilson et al. | |
| 5,289,677 A | 3/1994 | Jarrell | |

(Continued)

FOREIGN PATENT DOCUMENTS

WO     2011162845     12/2011

*Primary Examiner* — Logan Kraft
*Assistant Examiner* — Danielle M Christensen
(74) *Attorney, Agent, or Firm* — Carlson, Gaskey & Olds, P.C.

(57) ABSTRACT

A gas turbine bypass flow arrangement comprises an outer housing and an inner housing, an outer bypass duct defined between the outer housing and the inner housing and an inner bypass duct defined inwardly of the inner housing. A first heat exchanger is positioned at an upstream location within the outer bypass duct and a second heat exchanger is positioned within the inner bypass duct at an upstream location. A downstream heat exchanger is positioned to be in the path of air downstream of the second heat exchanger in the inner bypass duct. Air flowing across the downstream heat exchanger passes from the inner bypass duct into the outer bypass duct. A gas turbine engine is also disclosed.

20 Claims, 2 Drawing Sheets

(56) References Cited

U.S. PATENT DOCUMENTS

| | | |
|---|---|---|
| 5,407,319 A | 4/1995 | Harrogate et al. |
| 5,433,674 A | 7/1995 | Sheridan et al. |
| 6,575,703 B2 | 6/2003 | Simeone et al. |
| 6,901,739 B2 | 6/2005 | Christopherson |
| 7,246,484 B2 | 7/2007 | Giffin et al. |
| 7,824,305 B2 | 11/2010 | Duong et al. |
| 8,186,692 B2 | 5/2012 | Durocher et al. |
| 8,371,812 B2 | 2/2013 | Manteiga et al. |
| 8,388,307 B2 | 3/2013 | Smoke et al. |
| 8,402,742 B2 | 3/2013 | Roberge et al. |
| 2003/0226362 A1 | 12/2003 | Niday et al. |
| 2004/0020213 A1* | 2/2004 | Jones .................. F28D 15/02 60/772 |
| 2007/0186535 A1 | 8/2007 | Powell et al. |
| 2009/0000271 A1 | 1/2009 | Kupratis |
| 2009/0090096 A1 | 4/2009 | Sheridan |
| 2009/0145102 A1 | 6/2009 | Roberge et al. |
| 2015/0152789 A1* | 6/2015 | Thomas .................. F02C 9/18 415/144 |

\* cited by examiner

STAGED HEAT EXCHANGERS FOR MULTI-BYPASS STREAM GAS TURBINE ENGINES

CROSS REFERENCE TO RELATED APPLICATION

This application claims priority to U.S. Provisional Application No. 61/944,611 which was filed on Feb. 26, 2014.

STATEMENT REGARDING FEDERALLY SPONSORED RESEARCH OR DEVELOPMENT

This invention was made with government support under Contract No. FA8650-09-D-2923-D00021, awarded by the United States Air Force. The Government has certain rights in this invention.

BACKGROUND OF THE INVENTION

This application relates to a gas turbine engine having multiple bypass stream flows and wherein heat exchangers are staged within the bypass flows.

Gas turbine engines are known and include a fan delivering air into a bypass duct as propulsion air and, further, into a core engine. The core engine flow passes to a compressor where it is compressed and it is then delivered to a combustion section where it is mixed with fuel and ignited. Products of this combustion pass downstream over turbine rotors driving them to rotate.

Modern engines rely on the bypass flow to provide a larger and larger percent of the propulsion for the aircraft.

In some applications and, in particular, high speed military applications, there has recently been development of a multiple bypass flow engine. In such engines, there is more than one bypass duct to provide propulsion for the aircraft.

The bypass ducts are also utilized to cool heat exchangers for various functions. The bypass ducts in military applications generally are not unduly large and, thus, there is limited "face" area for air to pass through the heat exchangers.

SUMMARY OF THE INVENTION

In a featured embodiment, a gas turbine bypass flow arrangement comprises an outer housing and an inner housing, an outer bypass duct defined between the outer housing and the inner housing and an inner bypass duct defined inwardly of the inner housing. A first heat exchanger is positioned at an upstream location within the outer bypass duct and a second heat exchanger is positioned within the inner bypass duct at an upstream location. A downstream heat exchanger is positioned to be in the path of air downstream of the second heat exchanger in the inner bypass duct. Air flowing across the downstream heat exchanger passes from the inner bypass duct into the outer bypass duct.

In another embodiment according to the previous embodiment, a first stage fan delivers air inwardly of the outer housing and inwardly of the inner housing. A second stage fan delivers air inwardly of the inner housing, but does not deliver air inwardly of the outer housing.

In another embodiment according to any of the previous embodiments, at least one of the first and second upstream heat exchangers is utilized to cool electrical components.

In another embodiment according to any of the previous embodiments, at least one of the first and second upstream heat exchangers is utilized to provide air for use on an associated aircraft.

In another embodiment according to any of the previous embodiments, the downstream heat exchanger is utilized to cool cooling air to be used on an associated engine.

In another embodiment according to any of the previous embodiments, a core housing defines a radially inner extent of the inner bypass duct.

In another embodiment according to any of the previous embodiments, air passing through the downstream heat exchanger enters the outer bypass duct at a location downstream of the first heat exchanger.

In another embodiment according to any of the previous embodiments, at least one of the first and second upstream heat exchangers is utilized to cool electrical components.

In another embodiment according to any of the previous embodiments, at least one of the first and second upstream heat exchangers is utilized to provide air for use on an associated aircraft.

In another embodiment according to any of the previous embodiments, at least one of the first and second upstream heat exchangers is utilized to provide air for use on an associated aircraft.

In another embodiment according to any of the previous embodiments, the downstream heat exchanger is utilized to cool cooling air to be used on an associated engine.

In another embodiment according to any of the previous embodiments, a core housing defines a radially inner extent of the inner bypass duct.

In another featured embodiment, a gas turbine comprises a first stage fan and a second stage fan, said first stage fan delivering air inwardly of an outer housing, and into a second stage fan, said second stage fan further delivering air inwardly of an inner housing, and into a core engine including at least a compressor and a turbine, an outer bypass duct defined between said outer housing and said inner housing and an inner bypass duct defined inwardly of said inner housing. A first heat exchanger is positioned at an upstream location within the outer bypass duct. A second heat exchanger is positioned within the inner bypass duct at an upstream location. A downstream heat exchanger is positioned to be in the path of air downstream of the second heat exchanger in the inner bypass duct. Air flowing across the downstream heat exchanger passes from the inner bypass duct into the outer bypass duct.

In another embodiment according to the previous embodiment, a first stage fan delivers air inwardly of the outer housing and inwardly of the inner housing. A second stage fan delivers air inwardly of the inner housing, but does not deliver air inwardly of the outer housing.

In another embodiment according to any of the previous embodiments, at least one of the first and second upstream heat exchangers is utilized to cool electrical components.

In another embodiment according to any of the previous embodiments, at least one of the first and second upstream heat exchangers is utilized to provide air for use on an associated aircraft.

In another embodiment according to any of the previous embodiments, at least one of the first and second upstream heat exchangers is utilized to provide air for use on an associated aircraft.

In another embodiment according to any of the previous embodiments, the downstream heat exchanger is utilized to cool cooling air to be used on an associated engine.

In another embodiment according to any of the previous embodiments, the downstream heat exchanger is utilized to cool cooling air to be used on an associated engine.

In another embodiment according to any of the previous embodiments, air passing through the downstream heat exchanger enters the outer bypass duct at a location downstream of the first heat exchanger.

These and other features may be best understood from the following drawings and specification.

DETAILED DESCRIPTION

Figure 1:
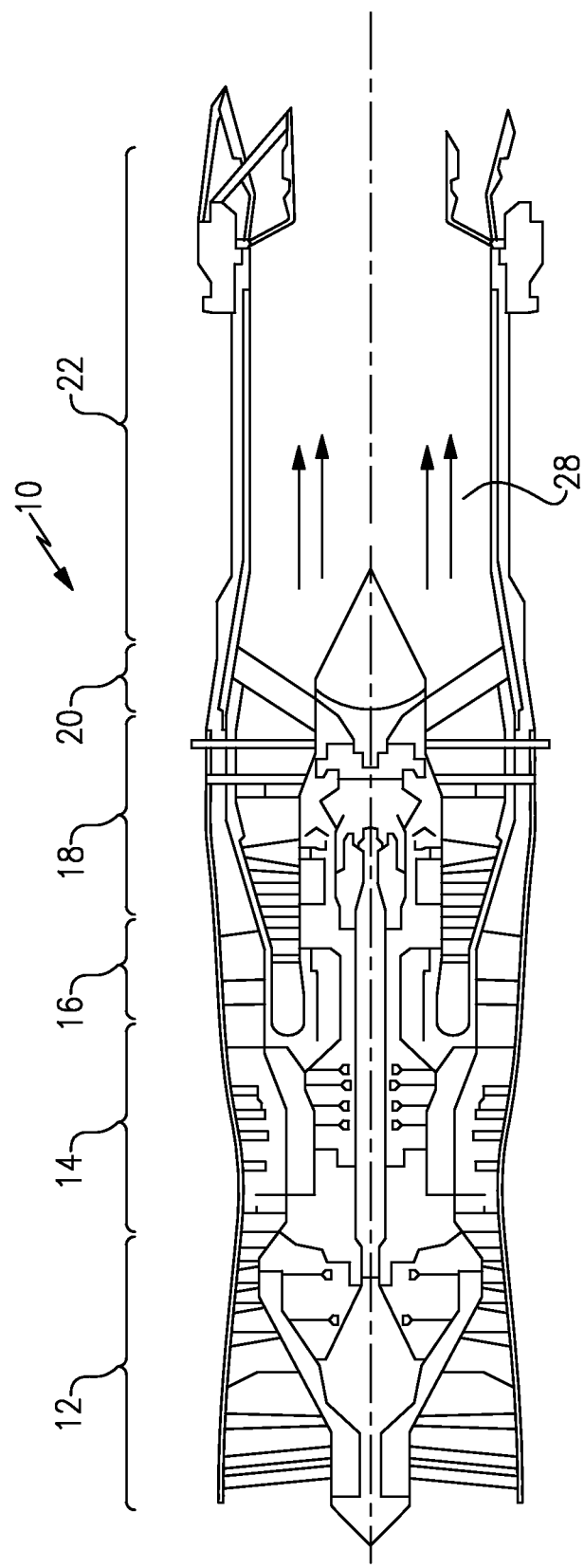
FIG. 1 schematically shows a gas turbine engine.

Referring to FIG. 1, a gas turbine engine 10 includes a fan section 12, a compressor section 14, a combustor section 16, and a turbine section 18. Air entering into the fan section 12 is initially compressed and fed to the compressor section 14. In the compressor section 14, the incoming air from the fan section 12 is further compressed and communicated to the combustor section 16. In the combustor section 16, the compressed air is mixed with gas and ignited to generate a hot exhaust stream 28. The hot exhaust stream 28 is expanded through the turbine section 18 to drive the fan section 12 and the compressor section 14. In this example, the gas turbine engine 10 includes an augmenter section 20 where additional fuel can be mixed with the exhaust gasses 28 and ignited to generate additional thrust. The exhaust gasses 28 flow from the turbine section 18 and the augmenter section 20 through an exhaust liner assembly 22.

Figure 2:
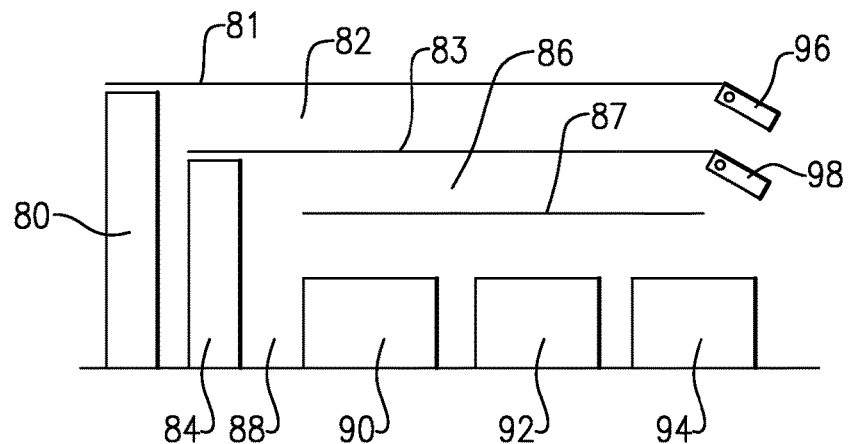
FIG. 2 schematically shows a multiple bypass flow arrangement.

In particular for engines for military applications, there has recently been provision of multiple bypass flow arrangements. Such an engine is shown schematically in FIG. 2. A first stage fan 80 delivers air into an outer housing 81. The outer housing 81 defines an outer bypass duct 82 outwardly of an inner housing 83. A second stage fan 84 delivers air downstream of the first stage fan 80 into an inner bypass duct 86. Inner bypass duct 86 is defined between an inner periphery of the inner housing 83 and an outer periphery of a core housing 87. Core housing 87 defines a radially inner extent of inner bypass duct 86. Controls 96 and 98 are shown schematically, which may be nozzles which control the flow of air through the bypass flow ducts 82 and 86.

First stage fan 80 delivers air inwardly of outer housing 81 and inwardly of inner housing 83. A second stage fan 84 delivers air inwardly of inner housing 83, but does not deliver air inwardly of outer housing 81.

A core engine inlet 88 receives air downstream of the second stage fan 84. That air passes into a compressor 90, a combustor 92 and a turbine 94. It should be understood that the compressor 90 may include multiple rotors and the turbine 94 may also comprise multiple rotors. The turbine rotors, as known, drive the compressor 90 and the fan stages 80 and 84.

It is known to use air in bypass ducts 82 and 86 to cool heat exchangers.

Figure 3:
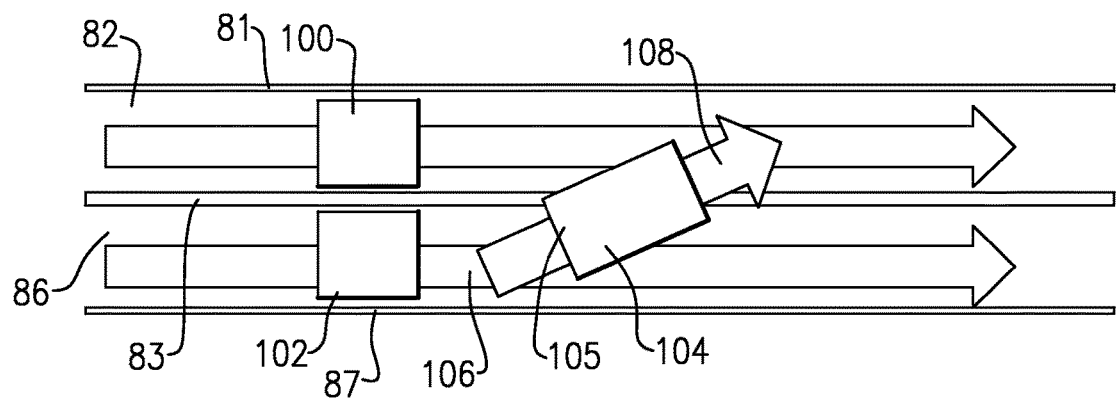
FIG. 3 shows the arrangement of heat exchangers into a multiple bypass gas turbine engine.

FIG. 3 shows an arrangement wherein upstream heat exchangers 100 and 102 are positioned within the bypass ducts 82 and 86, respectively. It should be understood that spaced circumferentially about a center axis of the engine, there may be a plurality of heat exchangers 100, 102 and 104. The upstream heat exchangers 100 and 102 may be heat exchangers that require a higher degree of cooling than a downstream heat exchanger 104. As an example, the upstream heat exchangers 100 and 102 may be utilized to cool electronics associated with the engine. Such heat exchangers may be known "integrated power package" heat exchangers. In addition, the upstream heat exchangers 100 and 102 may include heat exchangers which cool air to be utilized on the associated aircraft.

Air downstream of the upstream heat exchanger 102, at location 106, may be directed across the downstream heat exchanger 104. The downstream heat exchanger 104 may require a lesser degree of cooling. As an example, the downstream heat exchanger 104 may be provided for cooling air to be utilized on other locations at the engine.

As shown, the downstream heat exchanger 104 extends across a boundary and through the housing 83 such that an inlet 105 receives air from the inner bypass duct 86, downstream of the heat exchanger 102, and an outlet 108 extends into the outer bypass duct 82 at downstream location 108. Notably, the location 108 will be at a relatively low pressure compared to the location 106 and this will facilitate and drive air flow across the downstream heat exchanger 104.

Air passing through the downstream heat exchanger 104 enters outer bypass duct 82 at a location downstream of first heat exchanger 100.

By utilizing the downstream location for the downstream heat exchanger 104, a face area of heat exchangers, which may be cooled within a particular amount of bypass duct area is increased.

In sum, a gas turbine bypass flow arrangement comprises an outer housing 81 and an inner housing 83. An outer bypass duct 82 is defined between outer housing 81 and inner housing 83. An inner bypass duct 86 is defined inwardly of inner housing 83. A first heat exchanger 100 is positioned at an upstream location within outer bypass duct 82. A second heat exchanger 102 is positioned within inner bypass duct 86 at an upstream location. A downstream heat exchanger 104 is positioned to be in the path of air downstream of second heat exchanger 102 in inner bypass duct 86. Air flows across downstream heat exchanger 104 and passes from inner bypass duct 86 into the outer bypass duct 82.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine bypass flow arrangement comprising:
    an outer housing and an inner housing, an outer bypass duct defined between said outer housing and said inner housing, and an inner bypass duct defined inwardly of said inner housing;
    a first heat exchanger positioned at an upstream location within said outer bypass duct and a second heat exchanger positioned within said inner bypass duct at an upstream location; and
    a downstream heat exchanger positioned to be in the path of air downstream of said second heat exchanger in said inner bypass duct, and air flowing across said downstream heat exchanger passing from said inner bypass duct into said outer bypass duct.

2. The gas turbine bypass flow arrangement as set forth in claim 1, wherein a first stage fan delivers air inwardly of said outer housing and inwardly of said inner housing, and a second stage fan delivers air inwardly of said inner housing, but does not deliver air outwardly of said inner housing.

3. The gas turbine bypass flow arrangement as set forth in claim 2, wherein at least one of said first and second upstream heat exchangers being utilized to cool electrical components.

4. The gas turbine bypass flow arrangement as set forth in claim 2, wherein at least one of said first and second upstream heat exchangers being utilized to provide air for use on an associated aircraft.

5. The gas turbine bypass flow arrangement as set forth in claim 2, wherein said downstream heat exchanger being utilized to cool cooling air to be used on an associated engine.

6. The gas turbine bypass flow arrangement as set forth in claim 2, wherein a core housing defines a radially inner extent of said inner bypass duct.

7. The gas turbine bypass flow arrangement as set forth in claim 2, wherein at least one of said first and second upstream heat exchangers being utilized to cool electrical components.

8. The gas turbine bypass flow arrangement as set forth in claim 7, wherein at least one of said first and second upstream heat exchangers being utilized to provide air for use on an associated aircraft.

9. The gas turbine bypass flow arrangement as set forth in claim 1, wherein air passing through said downstream heat exchanger enters said outer bypass duct at a location downstream of said first heat exchanger.

10. The gas turbine as set forth in claim 9, wherein a first stage fan delivers air inwardly of said outer housing and inwardly of said inner housing, and a second stage fan delivers air inwardly of said inner housing, but does not deliver air outwardly of said inner housing.

11. The gas turbine bypass flow arrangement as set forth in claim 1, wherein at least one of said first and second upstream heat exchangers being utilized to provide air for use on an associated aircraft.

12. The gas turbine bypass flow arrangement as set forth in claim 1, wherein said downstream heat exchanger being utilized to cool cooling air to be used on an associated engine.

13. The gas turbine bypass flow arrangement as set forth in claim 1, wherein a core housing defines a radially inner extent of said inner bypass duct.

14. A gas turbine comprising:
a first stage fan and a second stage fan, said first stage fan delivering air inwardly of an outer housing, and into a second stage fan, said second stage fan further delivering air inwardly of an inner housing, and into a core engine including at least a compressor and a turbine, an outer bypass duct defined between said outer housing and said inner housing and an inner bypass duct defined inwardly of said inner housing;
a first heat exchanger positioned at an upstream location within said outer bypass duct and a second heat exchanger positioned within said inner bypass duct at an upstream location; and
a downstream heat exchanger positioned to be in the path of air downstream of said second heat exchanger in said inner bypass duct, and air flowing across said downstream heat exchanger passing from said inner bypass duct into said outer bypass duct.

15. The gas turbine as set forth in claim 14, wherein said at least one of said first and second upstream heat exchangers being utilized to cool electrical components.

16. The gas turbine as set forth in claim 15, wherein at least one of said first and second upstream heat exchangers being utilized to provide air for use on an associated aircraft.

17. The gas turbine as set forth in claim 14, wherein at least one of said first and second upstream heat exchangers being utilized to provide air for use on an associated aircraft.

18. The gas turbine as set forth in claim 17, wherein said downstream heat exchanger being utilized to cool cooling air to be used on an associated engine.

19. The gas turbine as set forth in claim 14, wherein said downstream heat exchanger being utilized to cool cooling air to be used on an associated engine.

20. The gas turbine as set forth in claim 14, wherein air passing through said downstream heat exchanger enters said outer bypass duct at a location downstream of said first heat exchanger.

* * * * *